Patented June 28, 1932

1,865,180

UNITED STATES PATENT OFFICE

WARREN F. FARAGHER, OF WOODBURY, NEW JERSEY, ASSIGNOR TO UNIVERSAL OIL PRODUCTS COMPANY, OF CHICAGO, ILLINOIS, A CORPORATION OF SOUTH DAKOTA

PROCESS FOR PRODUCING CATALYSTS

No Drawing.   Application filed June 15, 1931. Serial No. 544,687.

This invention relates to the manufacture of catalysts and refers more particularly to the preparation of finely divided metallic catalysts applicable for use in reactions involving the conversion of hydrocarbon materials.

More specifically the invention contemplates the provision of a process whereby various finely divided metallic substances used in hydrocarbon conversion reactions may be produced from their compounds under conditions tending to render them relatively more active than similar materials prepared under conditions of reduction in use in the art prior to the present invention.

Finely divided metallic catalysts are at present prepared by several different methods. One of the simplest methods consists in incorporating an aqueous solution of a salt of the metal with inert spacing materials such as sand, fuller's earth, crushed glass, porcelain, etc., controllably heating the mass to drive off water and the acid radical with which the metal is combined to produce the oxide of the metal, air being present if necessary to the formation of the oxide, and reducing the oxides at suitable temperatures in a stream of hydrogen or other reducing gas. Numerous catalysts prepared in this manner under properly controlled temperature conditions have a high degree of effectiveness in accelerating the normal rate of chemical reactions. Such metallic mixtures may be employed in either liquid or vapor phase reactions but are most commonly utilized in vapor phase reactions, the mass being positioned in a portion of the equipment used through which the reacting gas mixtures are passed.

Finely divided metallic catalysts may also be produced, principally for use in liquid or mixed phase reactions by dissolving or suspending decomposable compounds of the metals in liquids intended for subsequent reaction and decomposing the compounds in situ by the application of heat and sometimes during the passage of reducing gases through the liquid in which the metallic decomposition products are suspended.

Compounds and elements of extremely diverse character may function as catalysts in different chemical reactions and the present state of knowledge of catalytic functions seldom permits an accurate prediction as to the type of catalysts which will be found most effective for a given reaction or type of reaction. However, in the case of hydrocarbon oil conversion reactions, which includes reactions involving the addition of extraneous hydrogen to hydrocarbon oil mixtures certain finely divided metals and their oxides have been found to be of outstanding value as a result of extensive experimentation. The noble metals palladium and platinum and to some extent iridium have been found to readily catalyze hydrocarbon conversion reactions but owing to their sensitiveness toward such catalyst poisons as oxygen, sulphur and halides, and also to their high cost, these metals have not been employed commercially to any great extent in hydrocarbon conversion reactions. The group iron, nickel and cobalt constituting group 8 of series 4 of the periodic table are of more common occurrence and less expensive and while the most active member of the group, that it, nickel, is also sensitive to the poisoning influence of sulphur it has found in some cases commercial application. Iron has been found to have less activity but to be more resistant to the influence of poisons. In fact, it may be practically stated as a generalization that the more reactive catalysts are more sensitive to poisoning.

The catalytic value of finely divided metals or their oxides is to a considerable extent a function of their fineness of subdivision and the porosity of their structure, both of which properties seem to increase the degree of adsorption of reacting constituents upon the surface of the catalytic particles, which adsorption in turn increases the concentration with resultant increase in rate of reaction according to the well known laws of physical chemistry. It has been found by numerous investigators in the catalytic field that the fineness and porosity of catalysts are best retained when their preparation is effected at relatively low temperatures, and it would seem that this might be accounted for by the reduced tendency of the metals or their compounds to either decrepitation or slagging, resulting in a reduction of the effective surface in either event. As indicative of the activity of metals produced by the slow reduction of their oxides at low temperatures such reduced metals are frequently found to be pyrophoric, meaning that they reoxidize rapidly when exposed to air, sometimes at such a rate that they develop a mild incandescence or glow from which phenomenon the term "pyrophoric" originated.

The present invention is concerned with the production of extremely active metallic catalysts for use in hydrocarbon oil conversion reactions and in a specific embodiment the invention comprises producing metallic catalysts by reduction of various metallic oxides by activated hydrogen which permits a substantial lowering of the temperatures necessary for reduction to a given point.

Hydrogen may be activated in a variety of ways, for example, substantial yields of monatomic hydrogen are produced when tungsten wires are heated to incandescence in an atmosphere of hydrogen or when an electrical arc is maintained between tungsten electrodes. Under atmospheric pressures the initial dissociation temperature of the hydrogen molecule under these conditions is approximately 1900° C., whereas under a high vacuum corresponding to a fraction of a millimeter in absolute pressure this critical temperature may be reduced as low as 1300° C. When hydrogen is thus dissociated in closed containers, one portion of the disassociated molecule seems to be adsorbed on the tungsten and an equivalent portion repelled to the outer portions of the container. The activity of hydrogen containing even a small percentage of the monatomic form is evidenced by the fact that it is possible to reduce phosphorus to phosphine ($PH_3$) at ordinary temperatures and that the oxides of tungsten, platinum, copper, iron and zinc are all slowly but definitely reduced.

When molecular hydrogen is subjected to intense bombardment by alpha radiations a form of hydrogen is produced which corresponds to the form of ozone and has the formula $H_3$. Hydrogen containing the ozone form also reduces phosphorus to phosphine at ordinary temperatures and also forms hydrogen sulfide by reaction with sulphur and arsine ($AsH_3$) from arsenic. It may even react with nitrogen to form small amounts of ammonia. With mercury solid hydrides are formed which dissolve in hydrochloric and nitric acids and decompose to liberate hydrogen on gentle heat. Solutions of permanganates are also reduced to precipitate manganese dioxide ($MnO_2$) from aqueous solutions. The time during which the ozone form is retained after initial conversion is considerable and it is not destroyed either by filtering through media such as glass wool or by application of an intense electrostatic field.

When electricity is discharged through hydrogen at extremely high voltages in the neighborhood of 20,000 volts, it has been proven that there are formed not only charged atoms and charged molecules but also material amounts of the ozone form of hydrogen. At lower voltages in the neighborhood of 800 volts hydrogen is ionized by the detachment of a single elementary charge from the molecule but the gas molecule is not dissociated.

From the above it will be apparent that hydrogen may be activated for use according to the process of the present invention by high tension electrical discharges, the presence of incandescent metals such as tungsten in the gas and the employment of alpha radiations, and it is contemplated to employ any one or any combination of these means to activate hydrogen prior to or during its use as a reducing element for the production of active catalysts at low temperatures. For example, in the hydrogenation of petroleum fractions under high pressures, it is of considerable moment to increase the speed of the reactions as much as possible to enlarge the capacity of equipment which is necessarily heavy and expensive on account of the high pressures employed. In hydrogenating oils the preheated oil and hydrogen may be admitted to a high pressure reaction chamber containing active metallic catalytic material supported on finely divided clay, the passage of the oil and hydrogen through the interstices of the mass resulting in the addition of hydrogen to the oil and the production of increased amounts of saturated low boiling fractions. According to the process of the present invention such catalytic masses may be produced by reducing metallic oxides mixed with inert siliceous materials such as fuller's earth mentioned, by means of previously activated hydrogen such as may be produced by flowing the hydrogen stream over grids of incandescent tungsten filaments prior to the admission of the gas to the reaction chamber for the purpose of reducing the metallic oxide. Similarly the stream of hydrogen may be passed through a zone of high tension electrical discharge positioned at a point near enough to the point of application of the hydrogen to the oxide so that the activity of the gas is sufficiently retained. While the use of alpha radiation does not seem at present to hold any commercial possibilities, their use on an experimental scale has been definitely proven and it is contemplated to include their use within the scope of the present invention.

In hydrogenation reactions such as those involved in the hardening of oleic to stearic acid or the similar hardening of various liquid animal and vegetable fats, these reactions being frequently conducted in the liquid phase by introducing hydrogen in the presence of suspended metallic particles in the oil or fat, it may be possible by the use of the present invention to both produce the suspended catalyst at a lower temperature and also to conduct the hydrogenation step at reduced temperatures with resulting increase in overall efficiency.

It may be found that reduction of oxides by activated hydrogen for the production of catalysts is still more effectively accomplished when sub-atmospheric pressures are employed, which condition predisposes the hydrogen molecule toward dissociation and results in lowering of the temperature necessary for reduction.

In many instances it may be found that the most efficient catalyst is produced by reducing an oxide to a point short of complete reduction to metal. For example, ferric oxide may be reduced merely to the ferrous oxide and function very efficiently as a catalyzer for the type of reactions involved in miscellaneous hydrocarbon oil conversions.

Activated hydrogen may also be employed in the production of highly efficient catalysts by the regeneration of spent or poisoned contact masses since in the case of metals that have been converted to sulphides and contain carbonaceous depositions reducing their effective surface, the activated hydrogen may effectively remove the contaminated substances without the employment of excessively high temperatures.

As an example of results obtainable by the operation of the process of the invention it may be found that ferric oxide is reduced to ferrous oxide by ordinary hydrogen at atmospheric pressure at 300° F. to produce a highly pyrophoric substance, the rate of reduction being very slow. By utilizing preactivated hydrogen under the same temperature and pressure conditions it may be found that the rate of reduction is greatly accelerated, the product formed being of substantially the same reactivity as that produced by the use of molecular hydrogen. Furthermore, it may be found possible to lower the temperature of reduction to as low as 250° F. or lower and produce an active catalytic mass in all respects comparable to that produced at higher temperatures with non-activated hydrogen.

In the case of nickel it is commonly necessary to employ temperatures within the approximate range of from 400 to 500° F., to reduce nickel sesquioxide to partially reduced mixtures of high catalytic activity. By using previously activated hydrogen or by reducing the nickel oxide by hydrogen subjected during its period of contact with the nickel oxide to the action of silent or glow discharge in properly designed apparatus, it may be found to be possible to produce extremely active and completely reduced nickel at temperatures as low as 300° F., or lower and at rates which make the commercial use of the process entirely feasible.

Examples of catalyst manufacture according to the process of the present invention might be multiplied considerably over the ones given above but they will, however, suffice to show, even though cited merely as illustrations, that the process is applicable to the production of active catalytic bodies of a wide variety of types applicable to very diverse types of chemical reactions and it is to be understood that the examples given are not to be construed in a limiting sense upon the broad scope of the invention.

I claim as my invention:

A process for the production of highly active metallic catalysts comprising subjecting the corresponding metallic oxides to treatment at elevated temperatures with activated hydrogen.

In testimony whereof I affix my signature.

WARREN F. FARAGHER.